(12) United States Patent
Richeux

(10) Patent No.: US 7,624,670 B2
(45) Date of Patent: Dec. 1, 2009

(54) MILITARY VEHICLE COMPRISING A SWINGING ARM

(75) Inventor: Elisabeth Richeux, La Ciotat (FR)

(73) Assignee: Constructions Industrielles de la Mediterranee - CNIM, Paris (FR)

( * ) Notice: Subject to any disclaimer, the term of this patent is extended or adjusted under 35 U.S.C. 154(b) by 325 days.

(21) Appl. No.: 11/414,579

(22) Filed: Apr. 28, 2006

(65) Prior Publication Data

US 2006/0283316 A1 Dec. 21, 2006

(30) Foreign Application Priority Data

Apr. 29, 2005 (FR) .................................. 05 04384

(51) Int. Cl.
*F41A 23/24* (2006.01)
(52) U.S. Cl. ..................................... 89/37.07; 89/37.11
(58) Field of Classification Search ................ 89/37.07, 89/37.21, 38, 39, 37.11
See application file for complete search history.

(56) References Cited

U.S. PATENT DOCUMENTS 1,693,712 A * 12/1928 Henderson ................. 89/37.02
3,044,562 A * 7/1962 Crampton .................... 173/38
3,757,635 A * 9/1973 Hickerson et al. .......... 89/36.08
5,074,740 A * 12/1991 Weigel ....................... 414/550

FOREIGN PATENT DOCUMENTS

| DE | 30 29 294 | 2/1982 |
|---|---|---|
| DE | 33 16 068 | 11/1984 |
| DE | 33 41 875 | 5/1985 |
| DE | 34 37 625 | 4/1986 |
| DE | 35 24 244 | 1/1987 |
| DE | 37 38 835 | 5/1989 |

\* cited by examiner

*Primary Examiner*—Stephen M Johnson
(74) *Attorney, Agent, or Firm*—Ladas & Parry LLP

(57) ABSTRACT

A military vehicle having an armed turret and a swinging arm to move this armed turret. The vehicle is equipped with a gripping mechanism apt to attach the armed turret to one end of the swinging arm. This gripping mechanism has one male part connected to the end of the swinging arm and one female part connected to the armed turret, this male part can be locked mechanically into the female part due to at least one bolt activated by a hydraulic device. The turret is applied in self-defense of designed military vehicles intended to do engineering type projects.

13 Claims, 5 Drawing Sheets

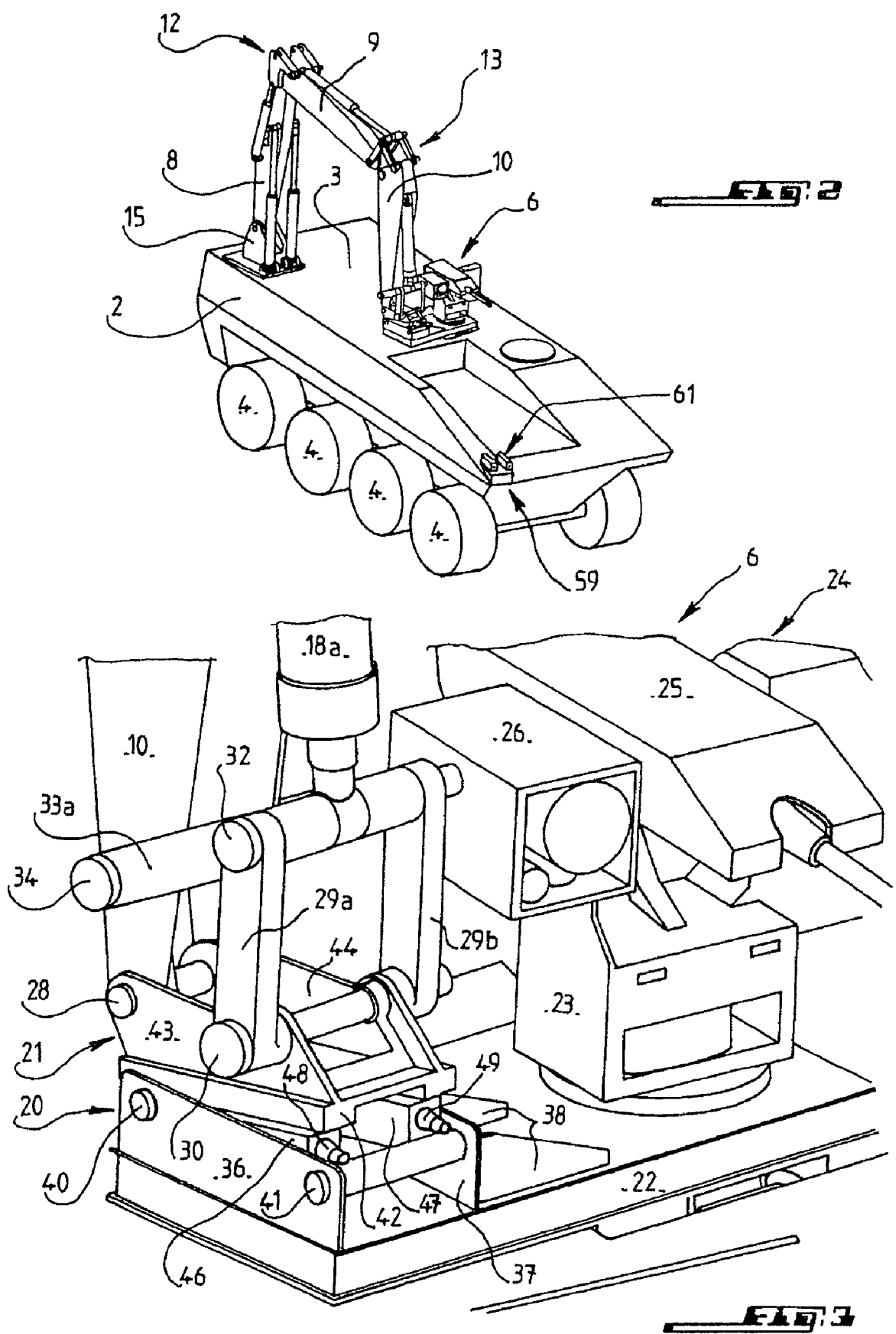

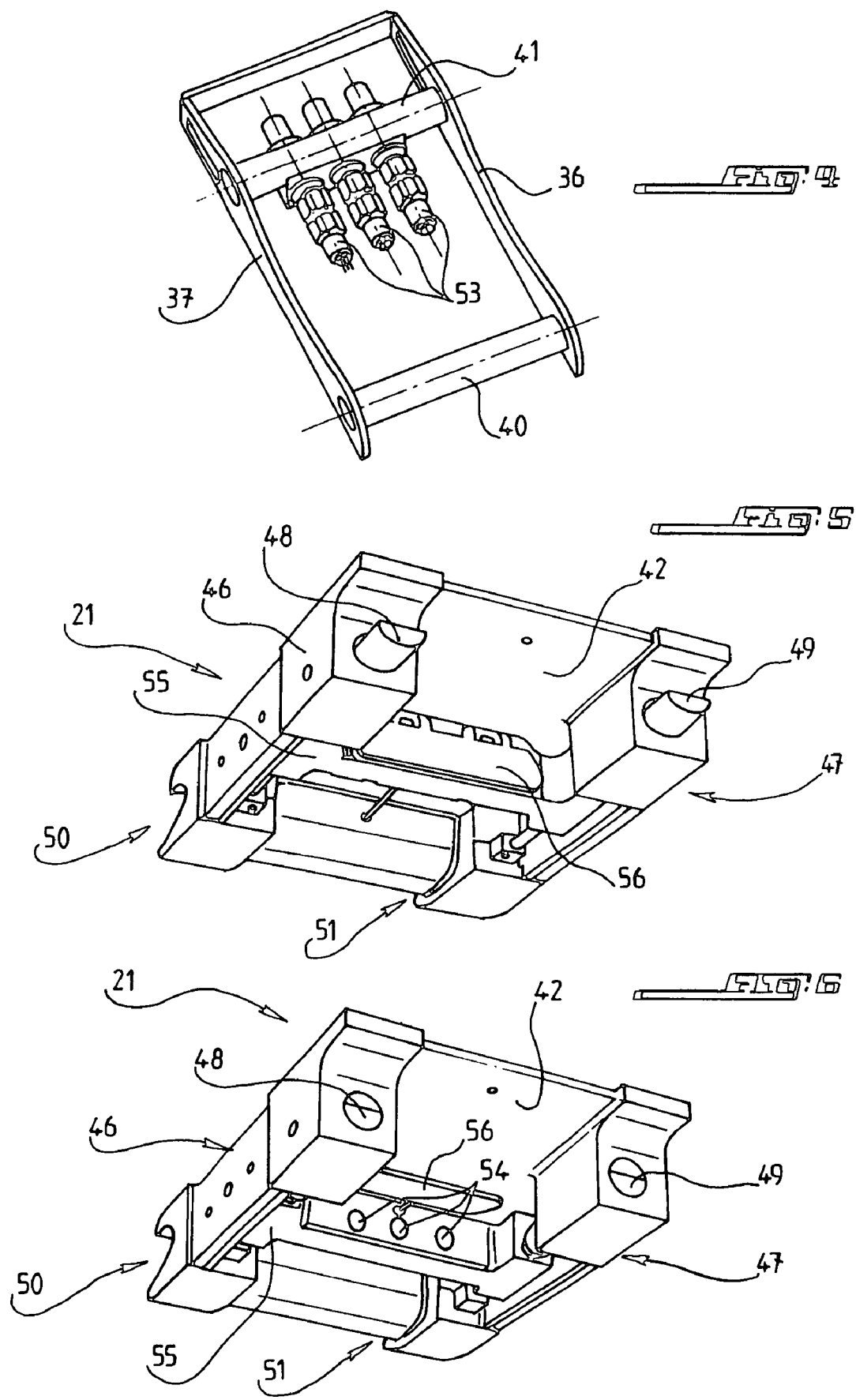

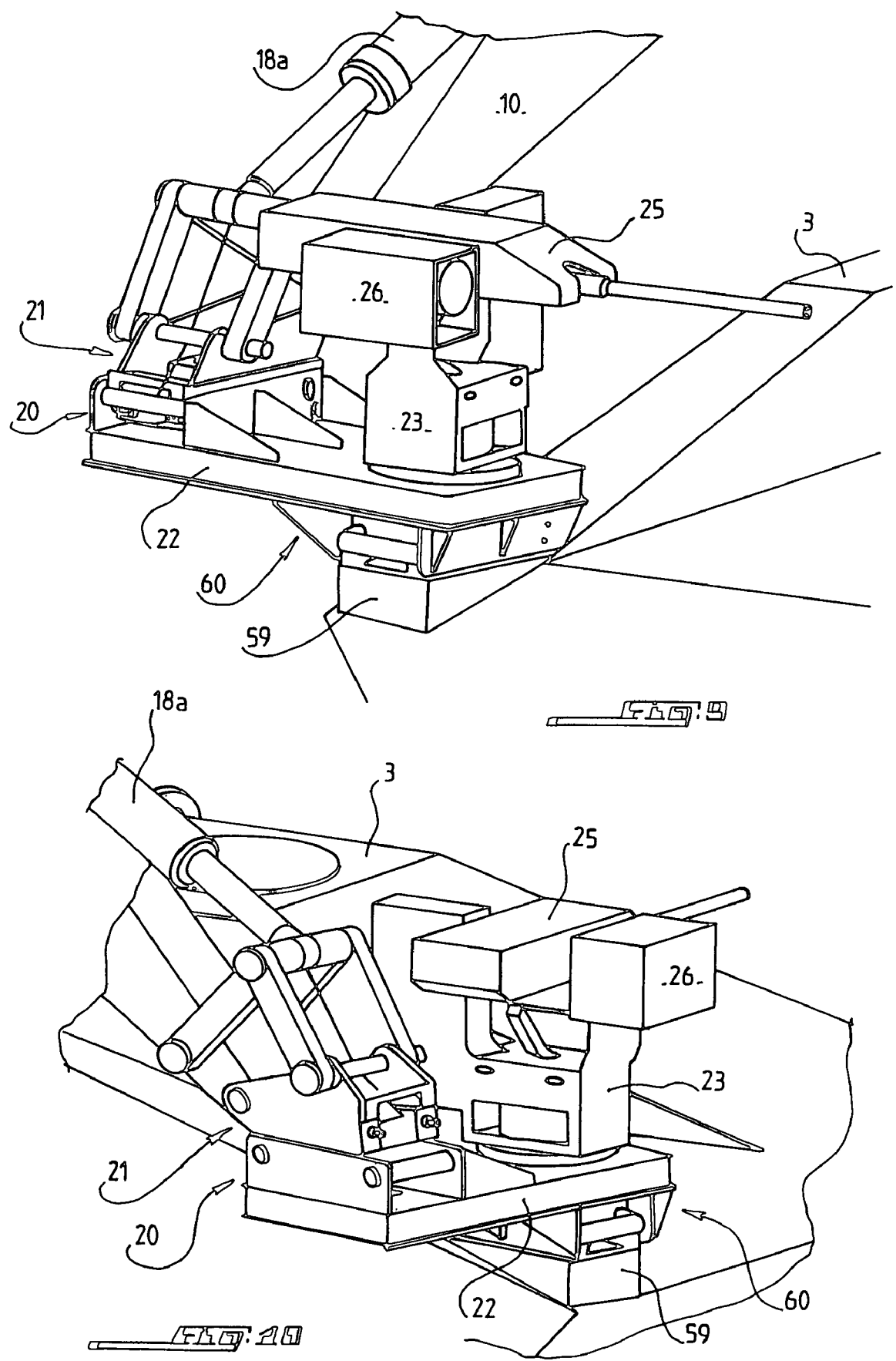

MILITARY VEHICLE COMPRISING A SWINGING ARM

FIELD OF THE INVENTION

The invention serves as a military vehicle comprising an armed turret and a swinging arm apt to receive various tools.

SUMMARY OF THE INVENTION

This type of vehicle, which is armored, is also especially used to do engineering projects. Such a vehicle is especially used to intervene in enclosed areas as, for example, between buildings or other existing structures in a city.

The armed turret, which is generally mounted on the roof, is intended for defensive shooting; however, to fire a shot generally requires the entire vehicle to move so that the turret is in a position to make it possible for the shot to reach the target. In this situation, the vehicle runs significant risk of exposing itself to the enemy to counterstrike.

The objective of the invention is to anticipate a design making it possible to reduce the movements required that the vehicle must make when it must counterstrike so as to expose the vehicle the least amount possible to the enemy in such a situation.

For this purpose, the invention serves as a military vehicle comprising an armed turret, a swinging arm, a gripping mechanism to attach the armed turret at one end of the swinging arm, this gripping mechanism comprising one male part connected to the end of the swinging arm and one female part connected to the armed turret, in which this male part can be locked mechanically into the female part due to at least one bolt activated by a hydraulic device.

When the vehicle must fire a counterstrike shot, the armed turret can be moved by the arm to fire a shot directly from the end of the arm so that it is not necessary to move the vehicle.

According to one characteristic of, the invention, the vehicle comprises at least two brackets apt to receive the armed turret, each bracket comprising one male part, and the turret comprises one second female part apt to be wedged into the male part of one or the other brackets.

The turret can thus be moved by the arm from a bracket of the vehicle towards another bracket of the vehicle to fire a shot from this other bracket.

According to another characteristic of the invention, each female part and each male part both include at least one hydraulic and/or electrical connector to connect hydraulically and/or electrically the male part to the female part, and in which the hydraulic device moves each bolt and each connector of the male part simultaneously when it is activated, so as to fit the connectors of the male part into the connectors of the female part.

According to another characteristic of the invention, at least one connector of the male part is protected by an access hatch that is closed when this male part is released and the locking hydraulic device is in an unlocked position.

According to another characteristic of the invention, the vehicle comprises at least one bracket apt to receive the armed turret, which is indexed, and ways of steering the arm and the gripping mechanism making it possible to grip through the arm of the armed turret on its indexed bracket and/or place the armed turret onto another indexed bracket automatically.

According to another characteristic of the invention, the armed turret comprises a turntable on which are mounted, on the one hand, the female gripping part and, on the other hand, a rotating shooting turrethead.

According to another characteristic of the invention, the vehicle moreover comprises a tool equipped with a female part of the gripping mechanism, this tool being a cup, an auger, a platform on which a person can get on, a concrete breaker, or a tool to install obstructing crossing beams and joists.

The invention will be better understood, and other objectives, characteristics, details and advantages of this invention will appear more clearly, in the descriptive explanation that will follow referred to in the visual drawings attached, given only as an example to illustrate how to build the invention and in which:

BRIEF DESCRIPTION OF THE DRAWING FIGURES

FIG. 2 is a second general view of the vehicle according to the invention;

FIG. 3 shows the attachment of the end of the arm to the turret;

FIG. 4 shows the female part of the gripping device;

FIG. 5 shows the male part of the gripping device in a locked position;

FIG. 6 shows the male part of the gripping device in an unlocked position;

FIG. 9 shows the placement of the turret on a second bracket;

FIG. 10 shows the uncoupling of the end of the arm after placement of the turret onto the second bracket;

DETAILED DESCRIPTION OF THE PREFERRED EMBODIMENTS

Figure 1:
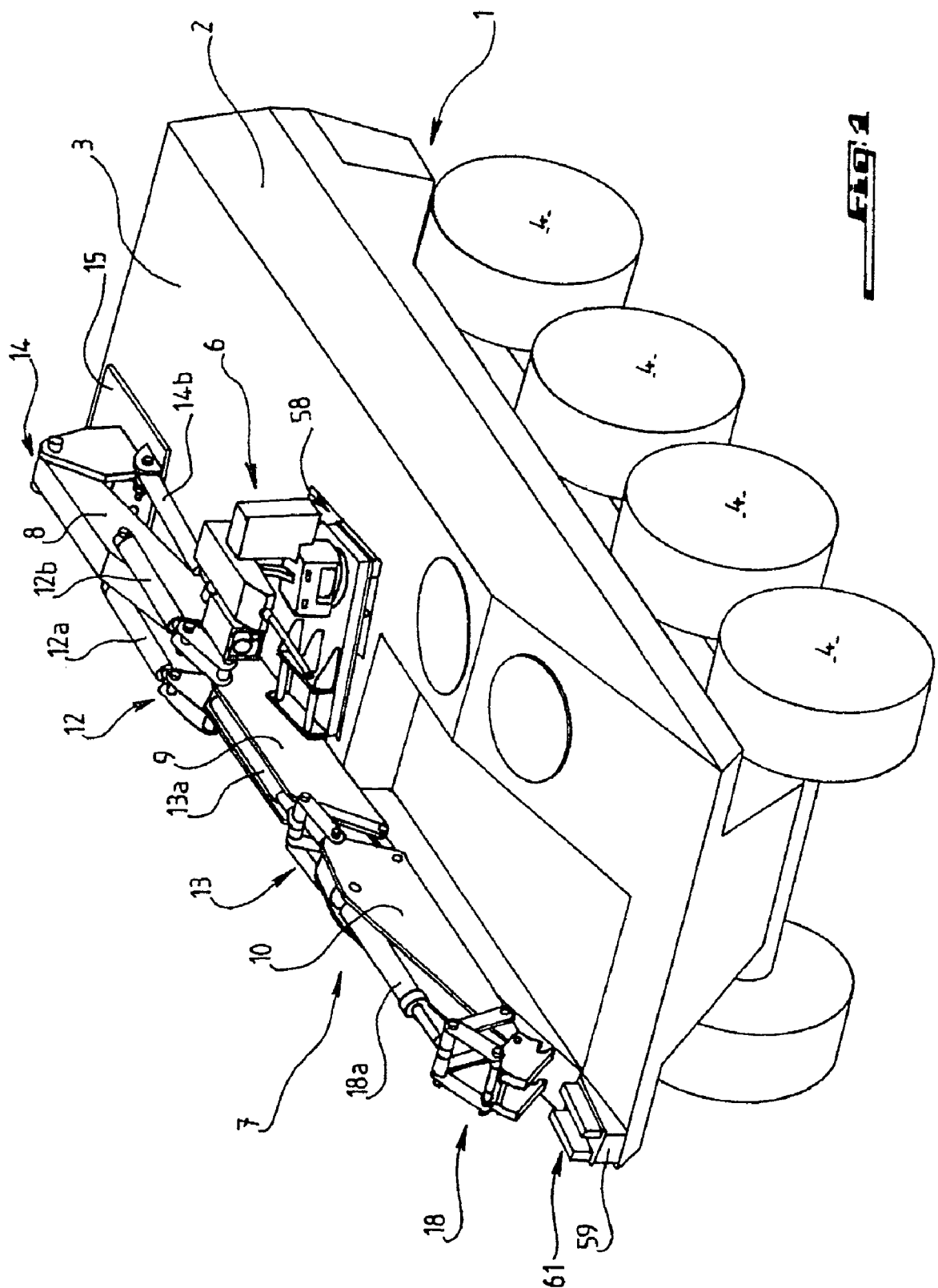
FIG. 1 is a first general view of the vehicle according to the invention.

FIG. 1, shows an armored military vehicle 1, intended to do jobs such as engineering projects. This vehicle 1 includes an outside armor 2 comprising an upper part or roof 3. Here it is a vehicle comprising eight wheels referenced by 4, but the invention is applied to an endless-track vehicle or other such vehicle.

This vehicle is equipped with an armed turret 6 that will be explained in more detail below and a swinging arm 7 apt to especially grab various engineering tools not represented to do jobs. This swinging arm comprises a first, second and third part referenced by 8, 9, and 10, which are hinged one in relation to the other.

This arm 7 comprises more specifically a first hinge referenced by 12, located slightly towards the back of the arm 7, that is to say between the first and second part 8, 9, this hinge 12 can be activated by two corresponding parallel jacks referenced by 12a and 12b.

A second hinge referenced by 13 links together the second part 9 to the third part 10 of the arm 7, this second hinge 13 can be activated by a jack referenced by 13a.

This arm 7 has its back end, that is to say its first part 8, attached by a third hinge 14 to a base plate 15. The base plate 15 being attached to a back section of the roof 3 of the vehicle while being apt to pivot around on a vertical axis. The third hinge 14 can be moved by two corresponding jacks 14a and 14b.

The arm 7 is still equipped on its front end, which is the front end of the third part 10, with a head 21 intended to be especially attached to a tool, this head itself being hinged in relation to the third part 10 of the arm 7 by means of a fourth hinge referenced by 18, and which is moved by a corresponding jack 18a.

The front end of the arm can thus be moved in a delimited space by means of a slightly round surface due to hinges 12, 13 and 14 that allow rotational movements of parts 8, 9 and 10, one in relation to the other, according to the parallel horizontal axes and due to the pivoting base plate 15 by which the arm can pivot around a vertical axis coinciding slightly to its back end.

In FIG. 1, the arm 7 extends horizontally along the upper right section of the roof 3 and, in FIG. 2, this arm is bent back and shaped in such a way that its front end is positioned level to the armed turret 6.

According to the invention, the front end of the arm 7 and the armed turret 6 are provided with ways of gripping making it possible to couple this turret to the front end of the arm 7 to move it in such a way as to fire shots from various locations without moving the vehicle.

This way of gripping comprises one male part and one female part apt to be attached to one another automatically. Corresponding male parts and female parts configured to attach to one another are referred to as a unit. For instance, a first male and female unit, a second male and female unit, and a third male and female unit.

The female part 20 is connected to the turret 6, and the male part 21 that is connected to the front end of the swinging arm 7, which is especially visible on FIG. 3.

In FIGS. 2 and 3, the turret is wedged into a first bracket of the vehicle located slightly in the center of the roof 3. As visible in FIG. 3, this turret 6 comprises a turntable 22 on which is mounted a cradle 23 apt to pivot around a vertical axis in relation to the turntable 22. The cradle 23 carries here a head 24 including in particular a machine-gun 25 as well as various other items such as the aiming component referenced by 26.

The male part 21 has its back part attached to the part 10 of the swinging arm 7 by a hinge 35 making it possible to pivot around a first horizontal axis 28. This male part 21 has its front part attached to the ends of two side rods 29a and 29b by a second axis 30 that is also horizontal.

The two side rods 29a and 29b have their two other ends attached to the front end of the jack 18a by a third axis 32, which is also horizontal. The third axis 32 is itself linked together to the front end of the arm 7 by two other side rods, of which one, 33a is visible in FIG. 3. These two other side rods are themselves hinged onto the third part of the arm 10 by a fourth axis 34 that is also horizontal.

The unit made up of the third part 10 of the arm 7, the male part 21 and the various rods, linked together by four axes 28, 30, 32 and 34, makes up as such a parallelogram that can be distorted, able to be activated by the jack 18a that is apt to move the third axis 32.

The female part 20 of the gripping component, which is attached to the turntable 22, is represented in more detail in FIG. 4. It mainly comprises two slightly rectangular flanges, vertical and parallel to one another, referenced by 36 and 37. As visible in FIG. 3, triangular reinforcing components 38 are welded to the turntable 22 and flange 37 while extending in line with the normal planes of the turntable and flange in order to keep this flange up in its plane when dealing with the mechanical strains it undergoes.

Two rods 40, 41 parallel to one another and normal to flanges 36 and 37 are mounted between these two flanges, each having a welded end to a flange. The rod 40 is mounted towards the back of the flanges, the rod 41 being positioned towards the front of these flanges.

As visible in FIG. 2, the male part 21 includes a base 42 on which two parallel flanges 43, 44 are affixed that extend vertically while being firmly attached to the upper face of this base 42. The first and second axes 28, 30 are attached to these two flanges.

This male part 21 furthermore comprises various components affixed to the lower face of the base 42 that appear in FIGS. 5 and 6. These components comprises two spars 46 and 47, which extend slightly to the right of the upper flanges 43 and 44 respectively.

Each spar 46, 47 comprises a male stub or bolt, respectively 48, 49, jointly activated through a hydraulic process such as a jack. These two bolts are apt to be extended to go way beyond the front end of the corresponding spar, as is the case in FIGS. 3 and 5, or be retracted so as to not go beyond, as in FIG. 6.

The two spars 46, 47 consist in their back part of a notch 50, 51 designed to fit into place on the back stem 40 of the female part 20 to make it possible to wedge the male part 21 into this female part 20.

The attachment of the male part 21 into the female part 20 consists, initially, in maneuvering the arm 7 to come up to the male part 21 of the female part 20 until slots 50, 21 are fitted into place onto the back stem 40, which corresponds to the situation in FIG. 3. Then, the bolts 48 and 49 are retracted and the male part 21 is lowered by means of jack 18a, until positioning of base 42 slightly parallel to the turntable 22, in a rotational movement of the male part 21 around the stem 40.

Figure 7:
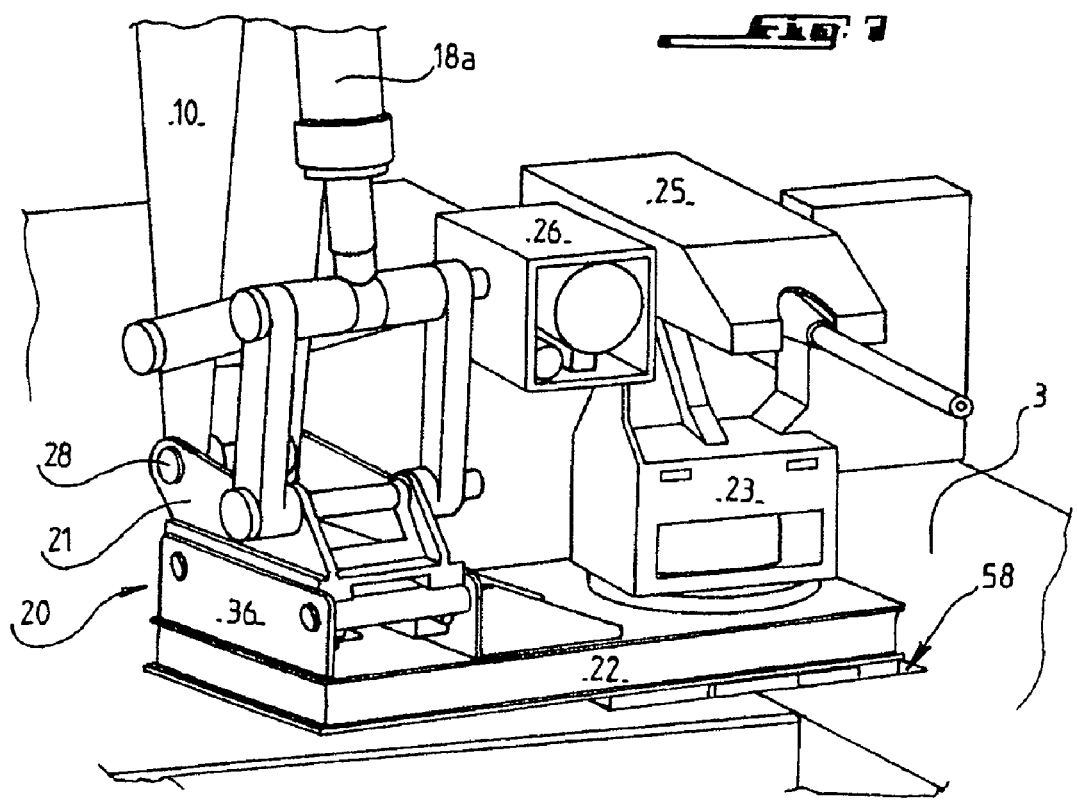
FIG. 7 shows the male part locked into the female part.

After the positioning of the base 42 parallel to the turntable 22, the bolts 48, 49 are extended to wedge under the front stem 41, which corresponds to a mechanically locked position of the male part 21 in the female part 20 of the gripping mechanism represented in FIG. 7.

The coupling of the male part 21 to the female part 20 of the first male and female unit also ensures the hydraulic and/or electrical connection of the male part with the female part as soon as the jack or jacks of the male part are activated to extend the bolts 48 and 49.

As visible in FIG. 4, the female part 20 comprises several connectors referenced by 53 that are affixed to the front rod 41 by extending parallel in the general direction of the flanges. The male part 21 also comprises additional connectors 54 that are attached to a sliding drawer 55 that is moved in translation with the bolts 48, 49 when these bolts are moved by hydraulic process.

As visible in FIGS. 5 and 6, the additional connectors 54 are protected by a swinging access hatch 56 that is connected in motion with the drawer 55. This access hatch 56 occupies a position in which it covers these connectors 54 when the male part 21 does not fit into place in a corresponding female part even though the drawer 55 is in a locked position, as in FIG. 5. This access hatch occupies another position in which it exposes the connectors 54 when the drawer 55 is in an unlocked position, as in FIG. 6.

When the male part 21 is fitted into place in the female part 20, the drawer 55 is placed in the unlocked position by hydraulic process so that the access hatch 56 exposes the connectors 54 and to retract the bolts 48 and 49. The male part 21 is then lowered into the female part 20 in such a way as the base 42 is parallel to the turntable 22.

In this situation, the connectors 53 of the female part 20 are located to the right of the additional connectors 54 of the drawer 55. The setting in motion of the hydraulic process to extend the bolts 48, 49 also results in moving the drawer 55 to fit into place the connectors 54 during this movement on the connectors 53. The access hatch 56 is then kept open by the connectors 53 on which it is supported, and along which it glides when the sliding drawer is moved.

In this situation, which is the one in FIG. 7, the coupling of the male part 21 with the female part 20 as well as the connection of the male part to the female part are accomplished without any human intervention having been necessary on the outside of the armor 2.

Other possibilities could be considered for the opening of the access hatch 56: it could, in particular, be opened, for example, mechanically when the male part is lowered into the female part.

The connectors 53, 54 strategically comprises hydraulic and/or electrical, and/or pneumatic connectors to transfer the hydraulic and/or electrical and/or pneumatic power from the arm 7 towards the armed turret 6. They also comprises electronic connectors to transmit data from the inside of the vehicle towards the turret 7, and vice versa. The hydraulic, electrical and eventually the pneumatic power supply run through the inside of the arm 7 up to the end of the arm.

Figure 8:
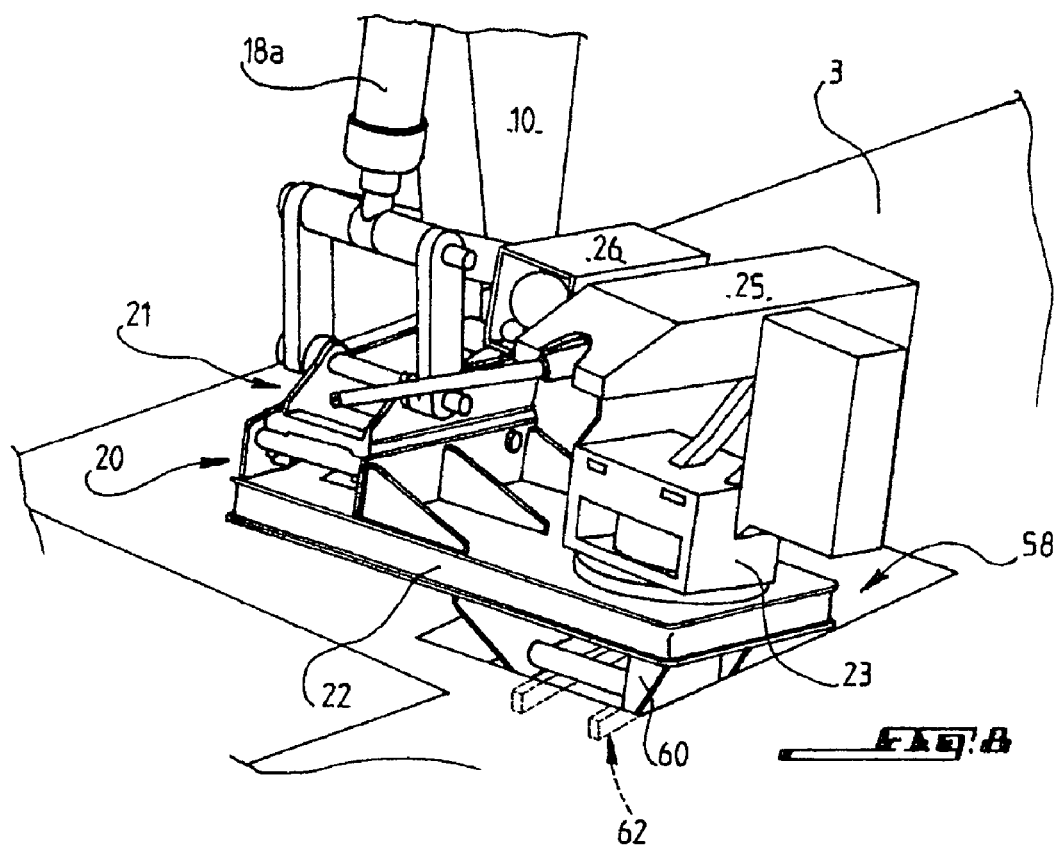
FIG. 8 shows the contraction by the swinging arm of the armed turret.

In the situation in FIG. 7, the turret 6 is attached to the end of the arm 7, it is then unattached from the first bracket 58, which is illustrated in FIG. 8, either to be positioned on the second bracket of the vehicle, referenced by 59, or to directly fire a shot from the end of the arm 7.

This second bracket is located on the right front of the vehicle and is especially visible in the overall views 1 and 2.

As visible in FIG. 8, the turret 6 that comprises a first female part 20 explained in detail further up, located on the upper face of the turntable 22, is also equipped with a second female part, referenced by 60, and that is affixed to the lower face of the turntable 22 to ensure the attachment of the turret 6 to the bracket 58 or the bracket 59.

For this purpose, the brackets 58 and 59 each comprise one corresponding male part 61, 62, which is analogous to the male part 21 equipping the end of the arm 7 explained in detail further up. These two other male parts also comprise bolts and contactors activated by hydraulic components.

After attachment of the end of the arm 7 to the turret by coupling the part 20 onto the part 21, the male part of the bracket 58 is actuated to be unlocked so as to make it possible to remove the turret 6, which is represented in FIG. 8.

This removal is initially accomplished through a rotational movement of the turret 6 to spread apart the front part from the female part 60 of the corresponding rod to the bracket 58. In a second step, the turret 6 is moved toward the front in the figures so as to release the slots of the back rod not visible in the figures.

The turret 6 is then moved by the arm 7 towards the second bracket 59 to be positioned and wedged into this bracket, according to a series of operations of the same kind as those explained in detail further up, mainly consisting in fitting into place the lower female part 60 into the corresponding male part of the bracket 59, then by locking this last male part with its connectors.

The arm 7 can then be uncoupled from the turret 6 to be either bent back or used for another purpose.

As indicated previously, the male parts of the first and second bracket 58 and 59 consist, same as for the male part 21 located at the end of the arm 7, of connectors ensuring the necessary connections with the lower female part 60 of the turret 6 as soon as the corresponding hydraulic processes are locked. The turret 6 is thus operational to take shots when it is wedged into the first bracket 58, when it is into the second bracket 59 and when it is wedged in the end of the arm 7.

With regards to the swinging arm 7, this one is strategically lashed on a bracket in a shooting position so as to limit the consequences of backfiring.

The vehicle can comprise other brackets apt to receive the turret. Strategically, the various brackets are indexed in such a way as the positioning operations of the arm and the coupling of the arm with the turret are accomplished completely automatically via a means for steering the swinging arm, which is a numerical control device apt to steer the movements of the arm 7.

The brackets apt to receive the turret 6 can themselves strategically be mounted on a rotating rim so as to make it possible to shoot off course.

For the most part, the implementation of various brackets on the vehicle offers the possibility to fire shots from different spots of the vehicle having each a stable seat, that is to say because of which the backfire due to shooting is slightly none, which makes it possible to improve the accuracy of the shot.

Therefore, due to the invention, the swinging arm of the vehicle, which is designed to grab various engineering tools, such as an auger, a platform that can hold people, a cup, a concrete-breaker, or even a tool to install obstructing crossing beams and joists, is also put to use to improve defensive conditions making it possible for this arm to move the armed turret 6 to take either shots from the end of this arm, that is to say from a spot located in the section able to be swept by this arm, or from one of the various brackets of the turret such as the first and second bracket of the turret represented in the figures.

The invention claimed is:

1. A vehicle comprising:
    an armed turret which is removably attached through first male and female unit to at least one first bracket on a roof of the vehicle, said first male and female unit being controllable to occupy a locked position wherein the armed turret is attached to the first bracket or an unlocked position wherein the armed turret can be removed from the at least one first bracket;
    a swinging arm having one end hingely connected to the roof of the vehicle; and
    a gripping mechanism adapted to attach the armed turret to an opposite end of the swinging arm through second male and female unit and to remove the armed turret from the bracket when the first male and female unit is controlled to occupy an unlocked position wherein the armed turret is attached to the opposite end of the swinging arm or a locked position wherein the armed turret can be removed from the opposite end of the swinging arm when the armed turret is attached to the first bracket, and wherein said first and second male and female unit are actuated by a hydraulic device of the vehicle.

2. Vehicle according to claim 1, wherein said second male and female unit comprises one male part attached to the opposite end of the swinging arm and one female part attached to the armed turret, and wherein the male part can be locked mechanically into the female part through at least one bolt of the male part actuated by the hydraulic device.

3. Vehicle according to claim 2, wherein each said female part and each said male part both include at least one hydraulic and/or electrical connector to connect hydraulically and/or electrically the male part to the female part and in which the hydraulic device moves each bolt and each connector of the male part simultaneously when the hydraulic device is activated, so as to fit the connectors of the male part simultaneously when the hydraulic device is activated, so as to fit the connectors of the male part into the connectors of the female part.

4. Vehicle according to claim 3, wherein at least one connector of the male part is protected by an access hatch that is closed when this male part is released and the locking hydraulic device is in an unlocked position.

5. Vehicle according to claim 2, in which the armed turret comprises a turntable on which are mounted, the female part and a rotating shooting turrethead.

6. Vehicle according to claim 1, wherein the first male and female unit comprises one male part attached to the first bracket and one female part attached to the armed turret, and wherein the female part can be wedged to the male part of the first bracket through at least one bolt of the male part actuated by the hydraulic device.

7. Vehicle according to claim 6, wherein said female part and said male part include at least one hydraulic and/or electrical connector to connect hydraulically and/or electrically the male part to the female part and in which the hydraulic device moves each bolt and each connector of the male part simultaneously when the hydraulic device is activated, so as to fit the connectors of the male part into the connectors of the female part.

8. Vehicle according to claim 1, further comprising a second bracket located at an emplacement of the roof different from the emplacement of the first bracket, and wherein the armed turret attached to the opposite end of the swinging arm can be locked to the second bracket through third male and female unit, said third male and female unit being controllable to occupy a locked position wherein the armed turret is attached to the second bracket or an unlocked position wherein armed turret can be removed from the second bracket.

9. Vehicle according to claim 8, wherein said third male and female unit comprises one male part attached to the second bracket and one female part attached to the armed turret, and wherein the female part can be wedged to the male part of the second bracket through at least one bolt of the male part actuated by the hydraulic device.

10. Vehicle according to claim 9, wherein said female part and said male part both include at least one hydraulic and/or electrical connector to connect hydraulically and/or electrically the make part to the female part and in which the hydraulic device moves each bolt and each connector of the male part simultaneously when the hydraulic device is activated, so as to fit the connectors of the male part into the connectors of the female part.

11. Vehicle according to claim 8, further comprising means for steering the swinging arm to a position relative to the roof wherein the gripping mechanism can attach the opposite end of the swinging arm to the armed turret unlocked from the first bracket or lock the armed turret attached to the opposite end of the swinging arm to the second bracket.

12. Vehicle according to claim 1, further comprising a tool equipped with a female part of the gripping mechanism, this tool being a cup, an auger, a platform on which a person can get on, a concrete breaker, or a tool to install obstructing crossing beams and joists.

13. A vehicle comprising:
an armed turret which is removably attached through first controllable male and female unit to at least one bracket on a roof of the vehicle;
a swinging arm having one end hingely connected to the roof of the vehicle;
a gripping mechanism adapted to attach the armed turret to an opposite end of the swinging arm and to remove the armed turret from the bracket when the first male and female unit is controlled to occupy its unlocked position; and
said first and second male and female means being activated by a hydraulic device of the vehicle; and wherein:
said second male and female unit includes one male part attached to the end of the swinging arm and one female part attached to the armed turret, in which this male part can be locked mechanically into the female part due to at least one bolt activated by said hydraulic device;
each female part and each male part both include at least one hydraulic and/or electrical connector to connect hydraulically and/or electrically the male part to the female part, and in which the hydraulic device moves each bolt and each connector of the male part simultaneously when the hydraulic device is activated, so as to fit the connectors of the male part into the connectors of the female part; and
at least one connector of the male part is protected by an access hatch that is closed when this male part is released and the locking hydraulic device is in an unlocked position.

* * * * *